Sept. 18, 1945.        P. W. TAYLOR            2,384,978
ELECTRIC ACCUMULATOR
Filed July 13, 1942
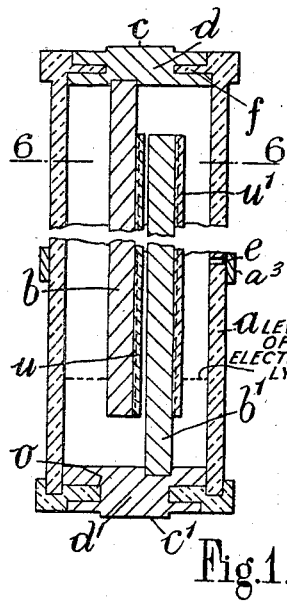
Fig.1.
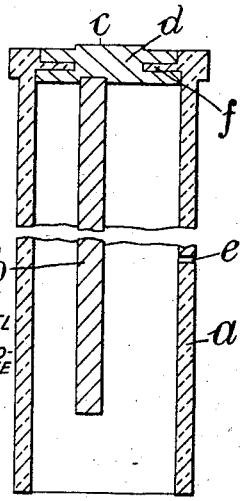
Fig.2.
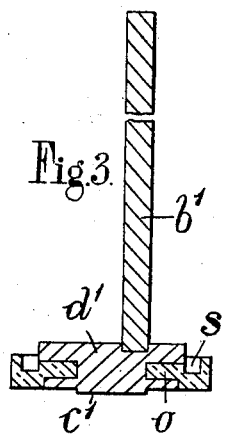
Fig.3.
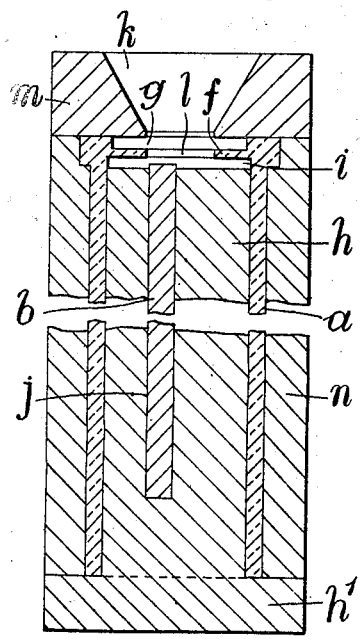
Fig.4.
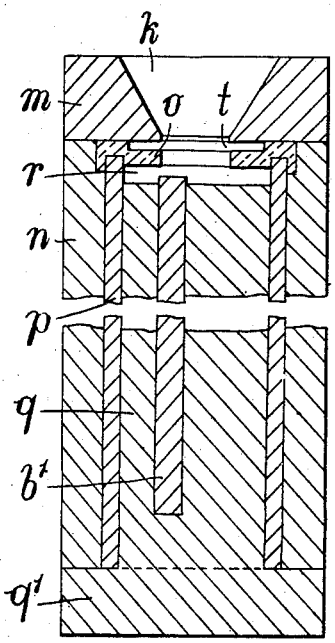
Fig.5.
Fig.6.
Inventor
P. W. Taylor
By Glascock Downing Seebold
Attys.

Patented Sept. 18, 1945

2,384,978

UNITED STATES PATENT OFFICE 2,384,978

ELECTRIC ACCUMULATOR

Percy William Taylor, Finchley, London N. 12, England, assignor of one-half to Fraser and Glass Limited, London, England Application July 13, 1942, Serial No. 450,700
In Great Britain July 21, 1941

2 Claims. (Cl. 136—6)

This invention relates to electric accumulators and more particularly such as are adapted for use in electric torches in substitution for flash light or torch batteries of the dry Leclanche cell type such as are normally employed.

The object of the present invention is to provide an electric accumulator which may safely be used in any position without the loss of electrolyte taking place.

The invention consists in an electric accumulator the plates and electrolyte of which are arranged in a normally sealed container which is of sufficient strength to withstand the gaseous pressure developed when recharging of the accumulator takes place.

The invention further extends to an accumulator as above specified comprising means for permitting at will the unsealing of the container for the purpose of releasing gaseous pressure developed during charging of the accumulator and the subsequent re-sealing thereof after charging has taken place.

In selecting a suitable electrolyte for use in an accumulator of the character above specified, it has been found desirable, if possible, to avoid the use of an ordinary sulphuric acid electrolyte owing to the relatively high gaseous pressure which is developed during discharge of the accumulator and the invention extends to the use in an accumulator as above specified of an electrolyte adapted to develop a relatively low gaseous pressure upon discharge of the accumulator.

The invention further extends to an electric accumulator as above specified in which the container is in the form of a cylinder, and plates forming the positive and negative poles are cast into position in the cylinder and secured to the ends thereof.

The invention also envisages charging the accumulator when already sealed by suitable control of the charging process and providing the wall of the accumulator casing with an aperture through which the acid may be filled into the casing.

The accumulator plates extend lengthwise of the interior of the casing in opposite directions from the ends of the casing and the arrangement precludes the possibility of the acid leaking through the said aperture, when such is provided.

The ends of the accumulator casing may be sealed by providing the same with end caps which are recessed to receive the ends of a tubular casing and are secured to the latter by an adhesive substance, the accumulator plates being sealed within the casing and the ends thereof completely sealed by an easily fusible metal, such as lead, being run into the centre of the end caps.

In the accompanying drawing:

Figure 1 is a vertical section through an electric accumulator in accordance with the invention, with, however, the electrolyte and spacing members omitted therefrom, Figure 2 is a vertical section through the accumulator container and one of the accumulator plates and end closures, as provided in one stage of the manufacture of the accumulator according to Figure 1, Figure 3 is a vertical section through the other accumulator plate and the end closure for the opposite end of the container, and formed in another step in the manufacture of the accumulator, Figure 4 is a vertical sectional view illustrating the mode of manufacturing the assembly according to Figure 2, Figure 5 is a vertical sectional view illustrating the mode of manufacturing the assembly according to Figure 3, and Figure 6 is a transverse section on the line 6—6 of Figure 1.

In carrying the invention into effect in one convenient manner in the production of an accumulator suitable for use in substitution for the usual types of dry batteries employed in electric torches and as illustrated in the drawing, the container, which may be of ebonite, Celluloid, glass, resin compositions, such as polystyrene resin, or other suitable insulating material, consists essentially of a cylindrical body $a$ having accumulator plates or strips $b$, $b^1$ sealed into the ends thereof so as to extend longitudinally in opposite directions within the interior of the body and be connected with the poles $c$, $c^1$ of the accumulator, which poles are constituted by the metal pieces $d$, $d'$ which serve to seal the accumulator plates in position, one such pole forming the negative pole of the accumulator and the other pole forming the positive pole thereof and the corresponding accumulator plate being negative or positive as the case may be.

The two plates are spaced a small distance apart laterally from one another as shown and in the completed accumulator are separated by means of thin wooden partition strips which extend across the entire width of the casing. The container has also introduced thereinto an electrolyte of a character adapted to develop a relatively low gas pressure upon discharge, the level of the electrolyte being indicated in Figure 1.

The accumulator container has a small aperture $e$ about midway therealong, which aperture is normally sealed, as by the application to the outside of the container, to close the aperture, of a detachable adhesive band $a^3$ and through which aperture the liquid electrolyte may be introduced into the container and the gases developed during recharging allowed to escape.

The container body, in its original state, is completely open at one end, as is clearly seen in Figure 2, and has an annular integral ring $f$ inwardly set from this end of the container to form an external circular recess $g$ which is ultimately filled with the metal $d$, which is conveniently lead which is non-porous to the electrolyte. To seal the accumulator plate $b$ into this end of the container it is convenient to employ a core $h$ having a flanged base $h^1$ on which the completely open end of the container rests, as shown in Figure 4, and which core is formed to have a close fit within the container tube $a$ but terminates short of the upper end of the latter so as to leave a circular space $i$ into which the upper end of the plate $b$, supported in the vertical slot $j$ in the core, extends and into which space the metal introduced through the funnel-shaped opening $k$ flows and enters through the central opening $l$ in the upper and partially closed end wall of the container. The opening $k$ is provided upon a separate block $m$ which rests upon the upper end edge of the container and the latter is arranged to be enclosed within a metal outer sleeve $n$ during the casting operation involved by the pouring of the lead to fill the spaces $g$ and $i$ and the central opening $l$ so that when the lead has been allowed to set the accumulator plate $b$ will be held keyed to the set metal and the latter will be cast into the end of the container to close that end thereof in a fluid-tight manner. In dismantling the core and associated parts and upon removal of the block $m$, a piece of the set metal will be left protruding from the end of the container and this serves to form the pole $c$. The result of this stage of the manufacture of the accumulator is seen in Figure 2. The plate $b^1$ is keyed at one end into an end ring $o$ which in turn is cemented into the open end of the container, as seen in Figure 1, to completely close and seal the container. This stage of the manufacture is shown in Figures 3 and 5 and involves the use of a tube $p$, similar to the tubular part of the container body $a$ and of another core $q$ which, except that the vertical slot therein in which the accumulator plate $b^1$ is accommodated is disposed on the opposite side of the vertical centre line compared with the slot in the core $h$, is the same as the core $h$ and has a flanged base $q^1$ upon which the lower end of the tube $p$ rests and terminates short of the upper end of the tube to leave a circular space $r$ into which the upper end of the accumulator plate $b^1$, which projects from its slot in the core $q$ extends to enable this portion of the accumulator plate to be keyed to the metal $d'$, when the latter is poured into this end. The ring $o$ has an annular recess $s$ near its outer periphery into which, during the casting operation, the upper end of the tube $p$ fits but into which the corresponding end of the container (that is, the open end of the container in the condition seen in Figure 2) ultimately fits. The ring also has a circular recess $t$ on its outer face and as the result of pouring the casting metal or lead into the funnel opening $k$ and the dismantling of the core and associated parts, including the tube $p$, when the metal has been allowed to set, the accumulator plate $b^1$ will be left keyed to the metal $d'$ and the latter cast into the end ring $o$ to completely close the latter as seen in Figure 3, wherein the other pole $c^1$ is also shown and is formed during the casting operation in the manner above described.

The ring $o$ is sealed into the end of the container tube by a suitable cementing agent. For instance, where a resinous composition, such as polystyrene resin, is employed to form the container body and the end cap $a$ satisfactory fluid-tight joint is obtained merely by the use of an appropriate solvent for the composition.

As above stated the two accumulator or electrode plates $b$, $b^1$ are spaced only a small distance apart and the space between the two plates is almost entirely filled by a separator strip $u$ which, as seen in Figure 6, extends across the casing $a$ and has a longitudinal channel $u^2$ along which the liquid electrolyte can flow. Another and similar strip $u'$ is provided and arranged in contact with the surface of the accumulator plate $b'$ immediately opposite the aperture $e$ and this strip also has a longitudinal channel $u^2$ along which the liquid electrolyte can flow. The two strips $u$, $u'$ extend across the entire width of the casing. The arrangement is such that if a limited quantity of electrolyte is filled into the accumulator casing $a$ and the latter is stood on end the electrolyte will tend to flow along the channels.

I claim:

1. An electric accumulator comprising a cylindrical insulating container having an aperture medially thereof for the introduction of liquid electrolyte and provided with end walls, plates cast into said end walls and extending longitudinally within said container in overlapping relation and partition strips extending completely across that portion of the width of the container common to both plates and having channels in the surfaces presented to said plates, one of said strips being located between said aperture and the adjacent plate.

2. An electric accumulator comprising a cylindrical insulating container having opposite end walls, flat plates cast in said end walls and arranged side by side in overlapping relation for a portion of their length in said container, and separator strips for said plates extending completely across the container and terminating short of the ends of the latter.

PERCY WILLIAM TAYLOR.